July 7, 1931.  C. W. RICE  1,813,768
WINDOW SHADE MOUNTING
Filed Jan. 17, 1930  2 Sheets-Sheet 1

Inventor
CHARLES W. RICE,
By Dyre and Kirchner
Attorneys

July 7, 1931.                    C. W. RICE                    1,813,768
                          WINDOW SHADE MOUNTING
                   Filed Jan. 17, 1930        2 Sheets-Sheet 2
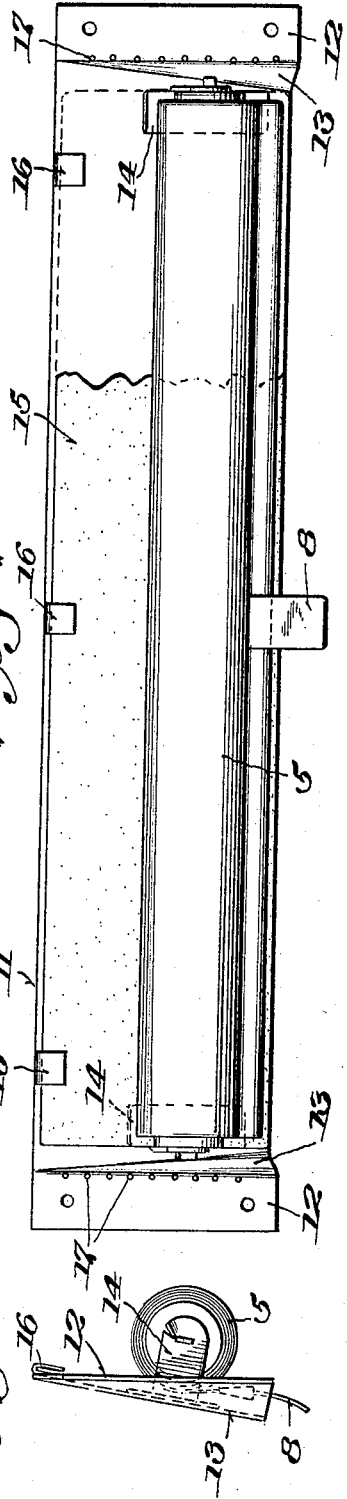
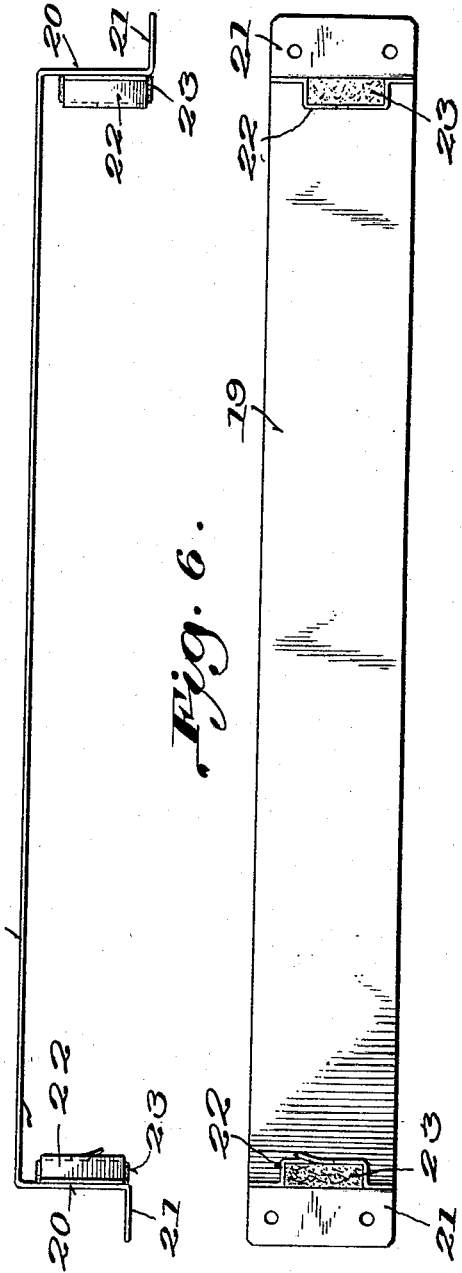
Inventor
CHARLES W. RICE
By Dyre and Kirchner
Attorneys Patented July 7, 1931

1,813,768

UNITED STATES PATENT OFFICE

CHARLES WESLEY RICE, OF UNION CITY, INDIANA

WINDOW SHADE MOUNTING

Application filed January 17, 1930. Serial No. 421,482.

My invention relates to window shade mountings, and more particularly to a detachable unitary assembly by which a window shade roller is adapted readily to be mounted in operative position in a wall structure, and especially in the framework of an automobile body adjacent the rear light thereof.

It is an object of the present invention to provide means for inexpensively, efficiently and neatly mounting a shade roller in an automobile in such a way that the brackets, roller and the portion of the shade which may at any time be wound around the roller shall be concealed from view in the wall of the automobile body.

It is a further object of my invention to provide a shade mounting assembly of the character described which is adapted to be received beneath the usual fabric material commonly used as a covering for the interiors of automobile bodies, and, more specifically, one in which a member is provided to carry the brackets which carry the roller, to mount the same in the automobile body, and which is adapted to be overlayed by the fabric covering of the automobile interior.

As commonly mounted prior to my present invention, automobile shade rollers are carried by a pair of independent brackets inside of the car body, no attempt being made to conceal the parts inside of the frame, as contemplated by my invention. This practice of the prior art results in several distinct disadvantages, among which may be mentioned the difficulty of centering the roller with relation to the window, the difficulty of aligning the two brackets in exact parallelism, the unsightly appearance of the shade when carelessly wound around the roller so that, as frequently happens, one edge of the shade is permitted to overrun one end of the roller, the susceptibility of the shade to dust and dirt, the high cost of suitably nickeled or lacquered brackets made of heavy material, and the general unsightly appearance of the roller and its appurtenant parts.

My present invention proposes to eliminate these disadvantages by the provision of certain novel means more particularly described hereinafter.

The foregoing and other objects and advantages, which will more clearly appear as the description proceeds, are attained by the novel combination of parts constituting the present invention, which is described hereinafter, illustrated in certain preferred forms of embodiment in the accompanying drawings, and more particularly pointed out by the appended claims.

In the drawings which form part of this application for Letters Patent and in which like reference characters indicate the same parts in the several views:

Fig. 3 is an end elevation of a shade roller mounting assembly constituting one embodiment of my invention;

Fig. 4 is a rear elevation of the structure shown in Fig. 3;

Fig. 5 is a top plan view of a modification of the structure shown in Figs. 3 and 4; and Fig. 6 is a rear elevation of the modification shown in Fig. 5.

Figure 1:
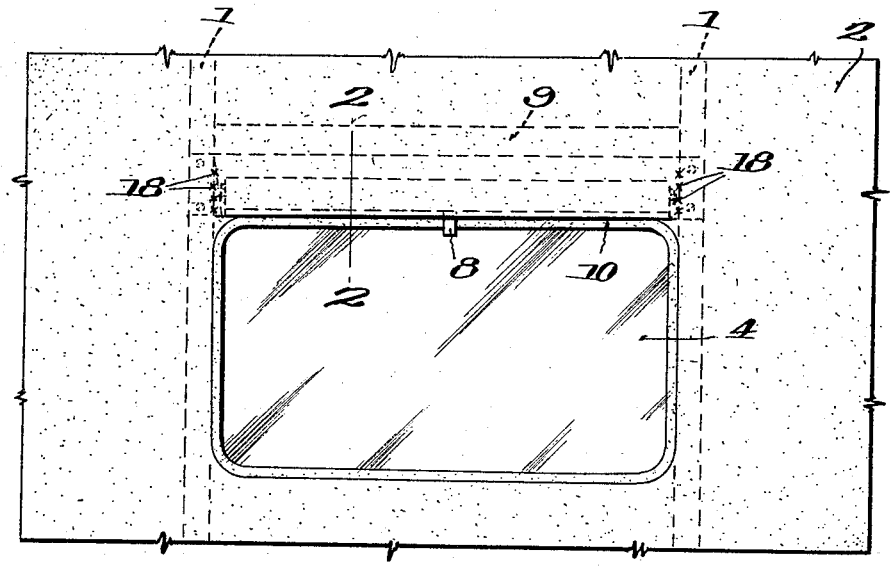
Figure 1 is an elevational view of a portion of the rear wall of an automobile interior.
Figure 2:
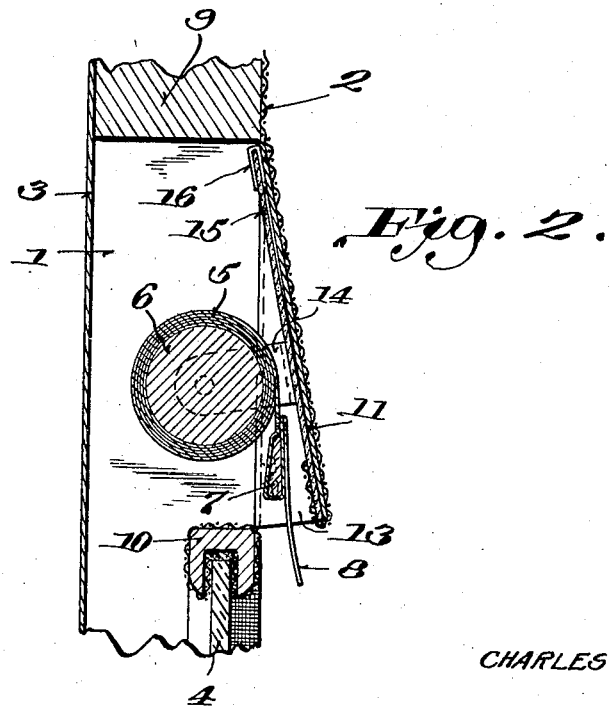
Fig. 2 is an enlarged cross section taken along the line 2—2 of Fig. 1.

Referring now to the drawings, the reference numeral 1 thereon indicates the customary vertical studding or structural ribs of wood or the like which form the framework of the usual closed car body, which framework is faced with a covering of fabric 2 to form the interior of the body, and sheet metal 3 to form the exterior thereof. The usual glass window pane or rear light is indicated at 4.

5 designates a web of suitable fabric forming a window shade secured at one end to a spring and ratchet actuated roller 6, and having at its free end a stick 7 and a depending tab 8 adapted to be grasped by the fingers to operate the shade in a well understood manner.

It is part of the essence of my present invention in one of its aspects to conceal within the framework of the body the shade roller and the shade which it carries. I accomplish this purpose by providing a relatively long and narrow pocket horizontally in the frame of the car, above the rear light, bounded at its ends by the two vertical ribs 1 between which the rear light is positioned, on its upper side by a transverse rib 9, and on its lower side by the upper edge of the channel forming the frame 10 of the window. While this arrangement constitutes a preferred embodiment of this feature of my invention, it will be understood that the necessary pocket may be provided in the framework in other ways, depending upon the type of frame construction found in the car, the preference of the designer, and other considerations. Thus, for example, in some bodies the transverse rib 9 will be found to be of considerable width, and in such cases the required pocket may be provided by indenting the lower edge of the rib, or by cutting a slot between the upper and lower edges of the rib. In any event, however, a recess is made in the frame of the car of dimensions sufficient to receive a shade roller of suitable size to accommodate the window or light 4.

The assembly which will now be described may be built into a new car during the construction thereof, or it may be placed in a car body which has already been completed. If the assembly is to be incorporated in a body which is being built, the operation is effected before the fabric interior lining 2 is placed in position. When mounting the invention in a finished car, the fabric covering 2 is first removed from the immediate vicinity of the pocket, and the shield plate generally designated 11 and shown in Figs. 3 and 4, is fitted over the pocket so that the roller which the shield carries will be received in the pocket. Screws or nails may then be passed through holes in the end portions 12 of the shield plate to attach the same securely to the vertical ribs 1, or other frame material forming the margins of the pocket.

The details of this assembly will now be described. It consists essentially of a shield plate 11 preferably stamped out of inexpensive sheet metal. It is substantially rectangular in projection, but is provided with a pair of end portions 12 which lie in one plane, and an intermediate portion 13 lying in another plane which makes an acute angle with the plane of the two end portions, so that the two planes intersect along the upper edge of the plate. It will be apparent from the drawings that the end and intermediate portions of the plate are joined by an integral bent portion 13.

A pair of brackets 14 is secured by spot welding, soldering or the like to the rear face of the plate and project therefrom at points spaced inwardly from the end portions 12. The brackets are provided with the well known round and square holes to constitute bearings for the pintles of the roller, and the brackets are made of such length that when the shade is wound completely on the roller, the space between the rear face of the shield and the nearest portion of the wound up shade will be insufficient to admit the stick 7, so that the roller cannot rotate beyond this limit to permit its spring to run down.

As has been explained, the assembly is mounted by fastening the end portions 12 of the shield to the vertical ribs 1. When this has been done, the fabric covering 2 is pulled down over the shield and its free end turned up underneath the lower edge of the shield and secured to the back thereof. Cement constitutes an obvious medium for effecting attachment between these two members, but since cement does not readily adhere to the metal of the shield, I have found it desirable to dispose behind the shield a strip of cardboard 15, which fits up into a plurality of small U-shaped portions of sheet metal 16 spot-welded or soldered to the upper edge of the rear face of the shield. The lower edge of the cardboard is made to extend either flush with or slightly beyond the lower edge of the shield, and the upwardly turned edge of the fabric 2 is readily cemented to the cardboard.

In order to make the fabric covering conform neatly to the contour of the shield over the bent portions 13, I provide the shield, along the inner edges of the end portions 12, with lines of small perforations 17 through which stitching 18 is passed uniting the fabric closely to the shield.

It will be evident that the arrangement just described provides an inexpensive, neat and efficient mounting for a window shade, by which the brackets, roller and such portion of the shade as may happen to be wound on the roller, are entirely concealed from view. When the assembly which constitutes this embodiment of my invention is mounted in an automobile no part thereof is visible from the interior of the car except the small depending tab 8.

In Figs. 5 and 6 I show a modification of the shade roller mounting means, which consists of a strip of relatively stiff material such as thin sheet metal bent substantially U-shaped to have a relatively long central portion 19, right angularly disposed portions 20 at the ends thereof, and flanges 21 at the ends of the portions 20 bent at right angles thereto so as to be parallel with the central portion 19. The flanges 21 are adapted to be secured to the margins of the pocket in the frame of the car. Shade roller bearing brackets 22 are spot welded or otherwise secured adjacent the inner faces of the portions 20. These brackets may be of box-like configuration, containing felt silencing washers 23, to eliminate rattling of the roller pintles in the brackets. When this form of the invention is used, the roller is mounted in the brackets to complete the assembly, and the whole unit is then fitted into the pocket in the frame of the car in such a way that the roller and all of the strip but the flanges 21 are received in the pocket. The fabric covering material employed in the interior of the car may or may not be used to cover a portion of the roller receiving pocket. It is to be understood that the structure illustrated in Figs. 5 and 6 constitutes part of an exceedingly inexpensive embodiment of my invention, and although this form does not have the desirable features of complete concealment of the roller which are possessed by the preferred embodiment, it does exhibit the advantages of a complete shade roller mounting adapted to be set up in operative position and removed as a unit.

Various other and further modifications of my invention may be practiced without departing from the spirit thereof, and all such modifications are to be considered within the scope and purview of the appended claims.

Having thus described my present invention what I claim and desire to secure by Letters Patent is:

1. In combination with a wall having a pocket therein adapted to receive a shade roller, a shield plate adapted to carry a shade roller along its rear face, having end portions engaging the wall at opposite edges of the pocket and a roller-concealing intermediate portion spaced at its lower edge away from the plane of the wall, and a covering material extending over the wall and the front face of the shield plate, a free end of the material being turned over the lower edge of the intermediate portion of said shield plate and secured to the rear face thereof.

2. The combination claimed in claim 1, in which a cement receiving member is associated with the rear face of the shield plate and the free end of the covering material is cemented to said member.

3. The combination claimed in claim 1, in which the shield plate is provided with a line of perforations inwardly of each wall engaging end and the covering material is made to conform to the contour of the shield plate by stitching passing through the perforations.

4. The combination claimed in claim 1 in which the upper edge of the intermediate portion of the shield plate engages the wall along the upper margin of the pocket therein.

5. In combination with a wall having a pocket therein, a shield plate for a window shade including a roller-concealing intermediate portion, end portions engaged with the wall at opposite margins of the pocket and roller-supporting brackets adapted to carry a roller received in the pocket, in combination with a ply of relatively absorbent material carried by the rear face of the intermediate portion and a fabric covering the wall and shield plate, the free end of said fabric being turned over the lower edge of said intermediate portion of the shield plate and adhesively secured to said ply of absorbent material.

6. A shield plate as claimed in claim 5 which includes a bent-over tab extending from the shield plate and engaged with the ply of absorbent material to prevent displacement of the ply from the shield plate.

7. A shield plate as claimed in claim 5 in which the roller-concealing portion and the wall-engaging end portions are positioned in different planes and in which a series of perforations is formed in each of the end portions adapted to receive stitches securing the fabric covering snugly over the roller-concealing and the wall-engaging portions of the shield plate.

In testimony whereof I affix my signature.

CHAS. WESLEY RICE.